United States Patent [19]

Dolsen et al.

[11] Patent Number: 4,652,873
[45] Date of Patent: Mar. 24, 1987

[54] ACCESS CONTROL FOR A PLURALITY OF MODULES TO A COMMON BUS

[75] Inventors: Phillip C. Dolsen, Richmond Heights; Chet J. Slabinski, Chargrin Falls, both of Ohio

[73] Assignee: The Babcock & Wilcox Company, New Orleans, La.

[21] Appl. No.: 571,773

[22] Filed: Jan. 18, 1984

[51] Int. Cl.$^4$ .............................................. H04Q 1/00
[52] U.S. Cl. ............................. 340/825.5; 340/825.51; 370/85
[58] Field of Search ........... 340/825.5, 825.51, 825.03, 340/825.59; 370/85, 86, 91; 307/98, 127, 131; 375/36

[56] References Cited

U.S. PATENT DOCUMENTS

| | | | |
|---|---|---|---|
| 3,832,689 | 8/1974 | Means et al. | 370/91 |
| 3,838,394 | 9/1974 | Sandoval | 340/825.03 |
| 4,337,465 | 6/1982 | Spracklen et al. | 340/825.03 |
| 4,411,004 | 10/1983 | Graham | 340/825.51 |

Primary Examiner—Ulysses Weldon
Attorney, Agent, or Firm—Vytas R. Matas; Robert J. Edwards

[57] ABSTRACT

A priority system for controlling the sequence in which requests made by modules, connected in parallel to a common bus, for access to the common bus is granted. A bus busy line is maintained at a first predetermined voltage if the common bus is not busy, and at a second predetermined voltage if the common bus is busy. A control and timing logic unit in each module senses the voltage on the bus busy line and permits access by the module to the common bus if the bus is at the first predetermined voltage (not busy). The control and timing logic unit then drives the voltage on the bus busy line to the second predetermined voltage, to indicate that the common bus is in use, thereby prohibiting access by other modules.

5 Claims, 1 Drawing Figure

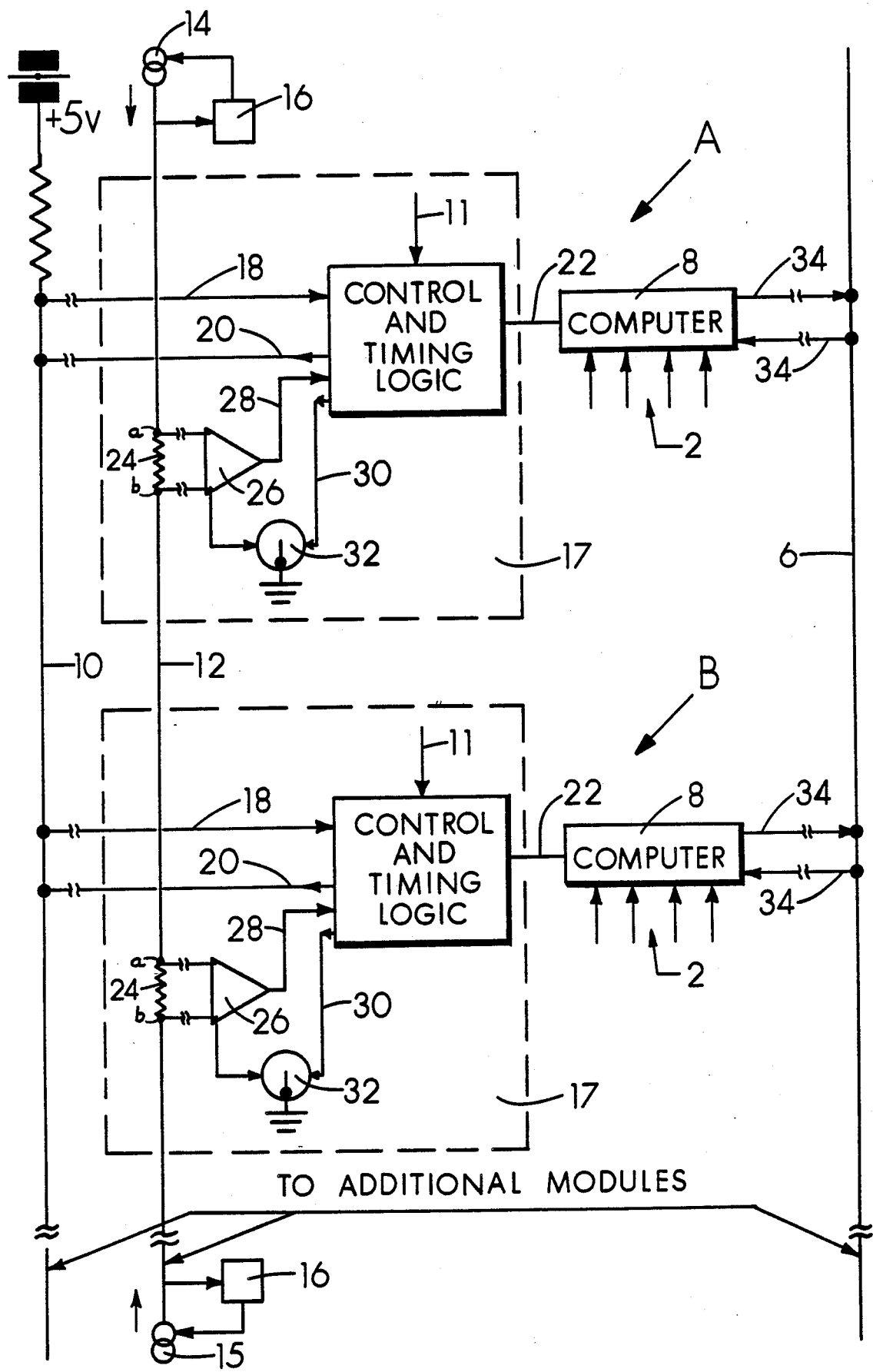

ACCESS CONTROL FOR A PLURALITY OF MODULES TO A COMMON BUS

TECHNICAL FIELD

This invention relates to a system for controlling the order in which individual modules located in a station system are granted access to a common bus.

BRIEF SUMMARY OF THE INVENTION

A station in a communication loop is usually comprised of a plurality of modules housed, for convenience, in a suitable support structure. As communication between modules is by way of a common bus, it is necessary that a control be provided for the order in which the modules are serially granted access to the bus. It is to such a control that this invention is primarily directed.

It is a further object of this invention to provide a control wherein the removal of a module or modules for repair, modification, or replacement does not disrupt the control of access to the bus.

These and other objects will be apparent as the description proceeds in connection with the drawing in which:

IN THE DRAWING

The drawing is an elementary one-line, block diagram of a bus access control embodying the principles of this invention.

DETAILED DESCRIPTION

Illustrated in the drawing are modules, generally identified as a module A and a module B, which are sufficient to explain this invention. However, there may be upwards of a string of 30 or more of substantially identical modules all adapted to receive from and transmit data to a common bus 6.

Each module may include, for example, a computer 8 which is adapted to receive data from the bus 6 through line 34 and transmit data to the bus through line 34. As shown, the unit 8 may also receive signals from diverse transducers such as temperature, rate of flow, pressure, liquid level, and the like, generally indicated at 2.

To determine the sequence in which modules requesting access to the bus 6 are granted, there is provided a bus busy line 10 and a grant line 12. The bus busy line is normally maintained at a positive voltage as, for example, five volts. The grant line 12 is provided at one end with a constant current source 14 and at the other end with a constant current source 15, each provided with a clamping circuit 16 to prevent saturation of the sources 14 and 15 when, under normal conditions, no current is otherwise being drawn through the grant line 12.

Upon a single module, for example module B, receiving a request signal through line 11 for the module to receive from or transmit data to the bus 6, a control and timing logic unit 13 senses through line 18 that the bus busy line is at plus five volts indicating that no other module is using the bus 6. An arbitration circuit, generally designated 17, resolves multiple requests by other modules, if any, and determines which module, for example A or B, may now use bus 6. Unit 13 of the permitted module then drives, through line 20, the bus busy line to zero volts inhibiting access of any other module or modules in the string of modules from gaining access to the bus 6. The control and timing logic unit 13 then transmits, through line 22, the necessary command signal for unit 8 to transmit to or receive from bus 6 the desired data. Following completion of the operation, the unit 13 restores the bus busy line 10 to its normal state of five volts, thus permitting any other single module to request access to the bus 6.

Since two or more modules in the string of modules may simultaneously request access to the bus 6, it becomes necessary to establish the order in which the modules will gain access to the bus. Such an order is accomplished by providing in each module a resistance 24 in the grant line 12, across which is connected at point a and point b a polarity detector 26 connected to the unit 13 through lead 28 which, upon a module requesting access to the bus 6, transmits a signal through a lead 30, closing a switch 32, grounding the line 12 at point b, thus causing a current flow through line 12 of one polarity from constant source 14 to the point of grounding. A current of opposite polarity then flows from constant current source 15 to ground. The signal indicative of a current flow of opposite polarity transmitted by the polarity detector 26 then inhibits access of all other modules to the bus 6. Thus, for example, if modules A and B simultaneously request access to the bus 6, module A will be granted access as there is a current flow of the said one polarity through resistor 24. Thus it will be the module in a string of modules, a plurality of which are requesting access to the bus 6, which senses the current flow of said one polarity and which gives access to the bus 6. Since the arbitration circuits 17 do not act instantaneously, the control and timing block 13 includes a time delay which prevents a module from gaining access to the bus 6 until the signal on line 12 has stabilized. This time delay is required to eliminate the possibility of more than one module from gaining access to the bus at the same instant.

We claim:

1. In a system having a plurality of modules connected in parallel to a common bus for receiving data from the common bus and transmitting data to the common bus, a priority system for controlling the sequence in which requests made by said modules for access to the common bus is granted, comprising:

a bus busy line, capable of being maintained at a first predetermined voltage if the common bus is not busy, and at a second predetermined voltage if the common bus is busy;

a control and timing logic unit in each of said modules for sensing the voltage on said bus busy line, permitting access to the bus if said bus busy line is at said first predetermined voltage and inhibiting access to the common bus if said bus busy line is at said second predetermined voltage;

a resistance in each of said modules;

means for switching the direction of current flow through each resistance in each of said modules;

a grant line for connecting, in series, all of said resistances in each of said modules, and capable of further connections at both ends of said grant line beyond said resistances;

means suitable for energizing both ends of said grant line by constant current sources;

means for preventing saturation of said constant current sources; and means included in each of said modules for permitting access by each module to the common bus only when the current flow through the module's included resistance is in a predetermined direction.

2. Apparatus as set forth in claim 1 wherein said means included in each of said modules for permitting access by each module to the common bus comprises:
- a polarity detector connected across each of said included resistances; and
- said switching means under the control of said control and timing logic unit grounding one end of said included resistance to establish a current flow therethrough in said predetermined direction.

3. Apparatus as set forth in claim 1 wherein said means for preventing saturation of said constant current sources comprises one clamping circuit for each of said constant current sources.

4. Apparatus as set forth in claim 1 wherein said first predetermined voltage is plus five volts.

5. Apparatus as set forth in claim 1 wherein said second predetermined voltage is zero volts.

* * * * *